United States Patent
Shimbo

(12)
(10) Patent No.: US 6,567,384 B1
(45) Date of Patent: May 20, 2003

(54) PORTABLE RADIO UNIT FOR USE IN MOBILE TELEPHONE SYSTEM AND CONTROL METHOD THEREOF

(75) Inventor: Atsushi Shimbo, Tokyo (JP)

(73) Assignee: Oki Electric Industry CO, Ltd., Tokyo (JP)

( * ) Notice: Subject to any disclaimer, the term of this patent is extended or adjusted under 35 U.S.C. 154(b) by 0 days.

(21) Appl. No.: 09/434,486

(22) Filed: Nov. 5, 1999

(30) Foreign Application Priority Data

Dec. 8, 1998 (JP) .......................................... 10-348173

(51) Int. Cl.[7] .............................................. G08C 17/00
(52) U.S. Cl. ....................................... 370/311; 455/522
(58) Field of Search ................................ 370/311, 337, 370/350, 328, 329; 455/343, 522, 574, 230, 231, 255, 256; 704/219, 262

(56) References Cited

U.S. PATENT DOCUMENTS

| | | | | |
|---|---|---|---|---|
| 5,708,658 A | * | 1/1998 | Sugita ......................... | 370/311 |
| 5,764,646 A | * | 6/1998 | Dent ........................... | 370/342 |
| 5,894,473 A | * | 4/1999 | Dent ........................... | 370/320 |
| 6,097,715 A | * | 8/2000 | Ichihara ....................... | 370/342 |
| 6,310,558 B1 | * | 10/2001 | Minami ....................... | 340/10.3 |
| 6,359,870 B1 | * | 3/2002 | Inoue et al. .................. | 370/337 |
| 6,389,296 B1 | * | 5/2002 | Shiraki et al. ............... | 370/335 |

FOREIGN PATENT DOCUMENTS

JP 09275587 A 10/1997

OTHER PUBLICATIONS

Agui, Takeshi and Nakajima, Kunio; "Computer Audio Processing" <Electronic Science Series> 86, pp. 43–49; published by Kosaido–Sanpo Shuppan Kabushiki Kaisha 1984.

* cited by examiner

*Primary Examiner*—Dwayne Bost
*Assistant Examiner*—Lewis West
(74) *Attorney, Agent, or Firm*—Rabin & Berdo, P.C.

(57) ABSTRACT

A control method of a portable radio unit for use in a mobile telephone system which can realize battery saving according to a use situation without allowing the user to set parameters when he is out of a service range. A reception intensity of control information is measured by a reception intensity detector, a time sequence as a result of the measurement is subjected to linear-predictive analysis by a linear prediction analyzer, a reception intensity at a next time is predicted, a receiving interval of the control information is set based on the predicted reception intensity, the reception intensity of the control information is measured based on the set receiving interval, the measured reception intensity is decimated by an intermittent receiving interval updater based on the set receiving interval, and an electric power consumption of a battery in a wait standby mode is saved by repeating the series of those operations.

17 Claims, 9 Drawing Sheets

PORTABLE RADIO UNIT FOR USE IN MOBILE TELEPHONE SYSTEM AND CONTROL METHOD THEREOF

BACKGROUND OF THE INVENTION

1. Field of the Invention

The invention relates to a portable radio unit for use in a mobile telephone system and, more particularly, a portable radio unit having a battery saving function and a control method thereof.

2. Description of Related Art

A technique in the field of mobile telephone system is disclosed, for example, in Japanese Patent Kokai No. 9-275587.

In a mobile telephone system, a service range is defined by a plurality of base stations and portable radio units perform communication operations when located in such a communicatable service range. For enabling the operation of a portable radio unit, it is necessary to maintain the unit in a usable state for a long-time by electric power stored in a battery which has a limited capacity.

The reduction of power current consumption of a portable radio unit, therefore, is one of important elements to decide the performance of the portable radio unit. Although a circuit design to reduce the current consumption has obviously been made hitherto, further, a method whereby even in a wait standby mode, a low electric power consumption mode is set or a power supply is stopped with respect to circuits except for the circuit which is actually operating is used.

The method of stopping the power supply to the circuits other than the actually operating circuit at the time of use will now be described with respect to a digital mobile telephone system as an example.

A portable radio unit of the digital mobile telephone system receives all of the frequencies peculiar to providers after a power source has been turned on and checks whether there is a channel whose reception level exceeds a threshold level. The threshold level is previously determined based on a reception level necessary to surely capture control information in the channel that is transmitted from the base station, continually.

If there is a relevant channel, whether the portable radio unit is located in the service range of the base station or not is discriminated, while the synchronization with that channel is established, depending on whether the control information in the channel can be received or not. When the control information can be received, it is determined that the portable radio unit is located in the service range of the base station. In this instance, the portable radio unit transmits its position information to the base station (position registration) and stores the received control information (identification information or the like of the base station).

The portable radio unit, therefore, is connected to a radio line through the base station and enters a standby mode. Once the portable radio unit enters the standby mode, it intermittently receives only the slot at the timing when the self portable radio unit is designated among the signals which are transmitted at a predetermined period from the base station, thereby enabling a call to be received. A method, therefore, whereby the shift to the low electric consumption state or the stop of the power supply is performed in a mode other than the reception mode to the circuit whose operation is unnecessary, thereby reducing the current consumption, has been used hitherto.

When the channel which exceeds the threshold level cannot be captured or, even if it can be captured, when the control information in the channel cannot be received, it is determined that the portable radio unit is located out of the service range. After that, until the portable radio unit moves into the service range of the base station and can receive the control information, a series of operations (control information capturing operation) is repeated until whether the portable radio unit is located in the service range or out of the service range is discriminated.

That is, in the portable radio unit, the control information capturing operation is repeated when the user is out of the service range of the radio base station or when the user is out of the service range because he is at a place where the radio wave does not reach (for example, in an underground area, in a building having a reinforced structure, or the like) although the area lies within the service range. Therefore, a receiving circuit and the other peripheral circuits always have to be in the operating state. There is, consequently, a problem such that when the user is out of the service range for a long time, although there is not a possibility that the portable radio unit enters the wait standby mode for this period of time, the receiving circuit and the peripheral circuits are made operative in vain, so that an electric power of a battery is consumed.

For example, in the apparatus disclosed in Japanese Patent Kokai No. 9-275587, the user himself can arbitrarily set and change a stop time of the receiving operation of an intermittent receiving process when he is out of the service range. Since the power supply to the receiving means is interrupted or the electric power consumption is reduced by electric power consumption suppressing means during the halt of the receiving operation of the intermittent receiving process, a battery saving effect is obtained.

A method is also disclosed wherein as the number of continuous times of determination that the user is out of the service range is larger, namely, as the time when the user stays out of the service range is longer, the receiving operation halt time of the intermittent receiving process of the control information for the returning to a place within the service range is automatically extended after completion of the discrimination that the user is out of the service range.

According to this method, battery saving which is settled to the receiving operation stop time whose upper limit is set and accords with a use situation of the portable radio unit of each user can be realized.

It is, however, difficult for the general user of the portable radio unit to understand a meaning of "setting of the intermittent receiving time when the user is out of the service range". Most of the users, further, do not read the operating instructions of the using method. There is, consequently, a problem that even if "the setting function" as shown in the conventional technique exists, it is not used in many cases.

There is further a problem that, in many cases, when the receiving interval is extended at "the number of continuous times of determination such that the user is out of the service range", the optimum control is not performed in the actual use environment.

OBJECT AND SUMMARY OF THE INVENTION

The invention has been made in consideration of the drawbacks mentioned above and it is an object of the invention to provide a control method of a portable radio unit for use in a mobile telephone system which can realize battery saving according to a use situation without allowing the user to set parameters when he is out of a service range.

To accomplish the above object, according to a first aspect of the invention, there is provided a control method of a portable radio unit for use in a system comprising the steps of: (a) measuring a reception intensity of control information by a reception intensity detector; (b) time-sequentially linear-predictive analyzing the measured reception intensity by a linear prediction analyzer; (c) predicting a reception intensity at a next time; (d) setting a receiving interval of the control information on the basis of the predicted reception intensity; (e) measuring the reception intensity of the control information on the basis of the set receiving interval; (f) decimating the measured reception intensity on the basis of a receiving interval set by an intermittent receiving interval updater; and (g) saving an electric power consumption of a battery in a wait standby mode by repeating the series of operations (a) to (f).

According to a second aspect of the present invention, in the portable radio unit according to the first aspect, a fluctuation period of the reception intensity is obtained by using a prediction coefficient calculated to predict the reception intensity at the next time, and it is controlled so as to extend the receiving interval in the case where the obtained fluctuation period becomes so short as to obstruct a talking and the reception intensity is also small.

According to a third aspect of the present invention, in the control method of a portable radio unit according to the first or second aspect, a hardware scale is reduced by using the linear prediction analyzer in common with an audio encoder.

According to a fourth aspect of the invention, in the control method of a portable radio unit according to the first, second or third aspect, the intermittent receiving interval is controlled in accordance with a battery residual amount by adding a battery residual amount detecting function.

According to a fifth aspect of the present invention, in the control method of a portable radio unit according to the fourth aspect, by adding a battery charging interval learning function, the intermittent receiving interval is controlled in accordance with a prediction value of a time that is required until a portable radio unit is set to a charger and the battery residual amount.

According to a sixth aspect of the present invention, in the control method of a portable radio unit according to the fifth aspect, by adding a talking time learning function, the intermittent receiving interval is controlled in accordance with the prediction value of a time that is required until the portable radio unit is set to the charger, an average talking time, and the battery residual amount.

According to a seventh aspect of the present invention, there is also provided a portable radio unit for use in a mobile telephone system having a function to measure an elapsed time after completion of a transmitting or receiving operation, wherein an intermittent receiving interval of a control signal is controlled in accordance with the elapsed time after completion of the operation, and an electric power consumption of a battery in a wait standby mode is saved.

According to a eighth aspect of the present invention, in the control method of a portable radio unit according to the first, second, third, fourth, fifth, or sixth aspect, a function to measure an elapsed time after completion of a transmitting or receiving operation is added, a multiplier according to the elapsed time after completion of the operation is replaced to a linear filter whose high band is attenuated, and the intermittent receiving interval is controlled in accordance with a reception field intensity.

DETAILED DESCRIPTION OF THE PREFERRED EMBODIMENTS

Embodiments of the present invention will now be described in detail hereinbelow with reference to the drawings.

The first embodiment of the invention will be first described.

Figure 1:
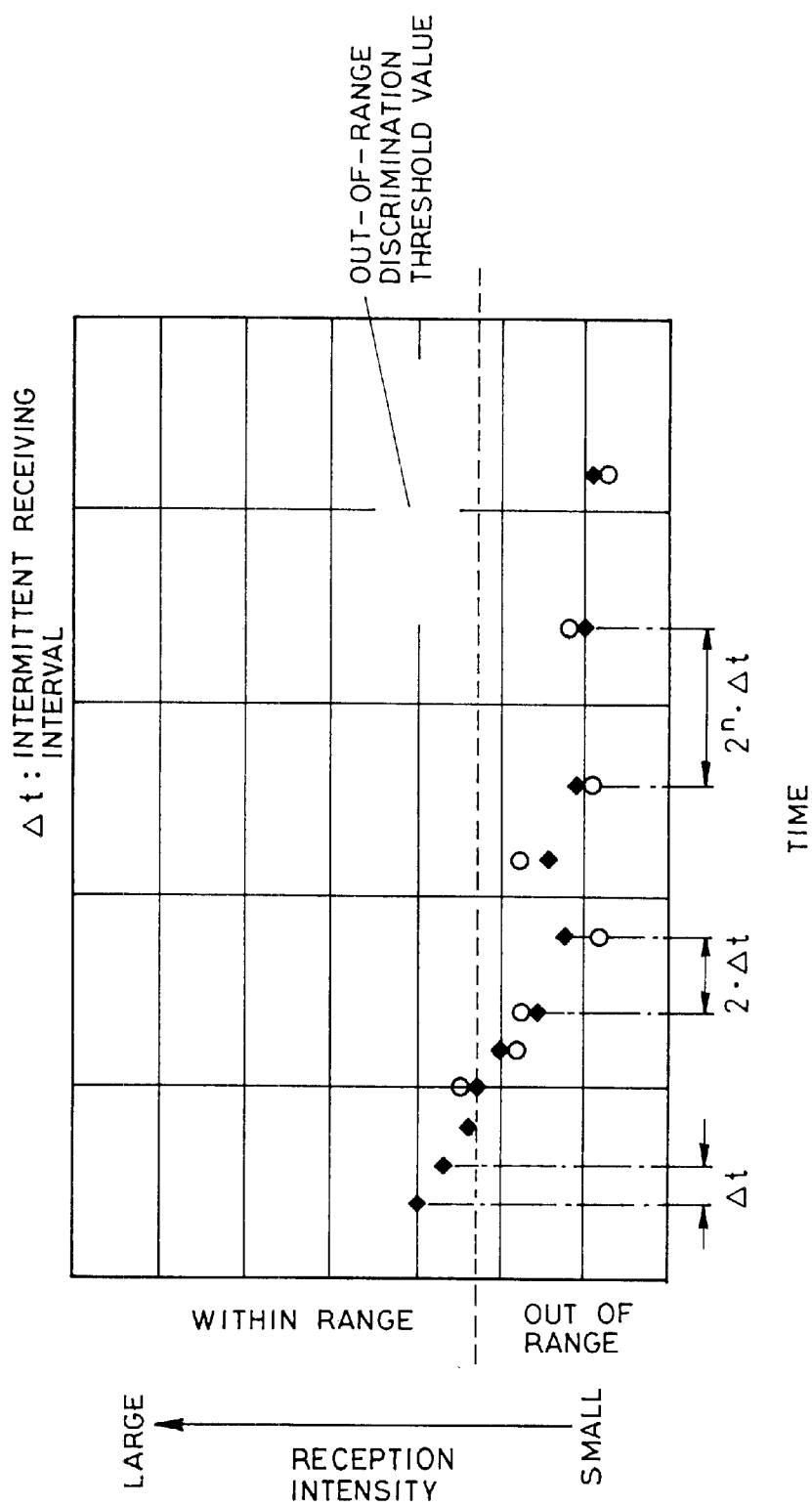
FIG. 1 is a diagram showing the operation of a portable radio unit for use in a mobile telephone system according to the first embodiment of the invention.

FIG. 1 is a diagram showing the operation of a portable radio unit according to the first embodiment of the invention. In the diagram, an axis of ordinate indicates a reception intensity of control information and an axis of abscissa shows an elapsed time. A plotted point of a rhombus (♦) denotes a reception intensity at time t.

In the diagram, the reception intensity decreases with the elapse of time and the user moves from a place in a service range toward a place out of the range. "$\Delta t$" denotes an intermittent receiving interval when the user exists in the range. When the reception intensity is equal to or larger than an out-of-range discrimination threshold value, it is decided that the user is located in the range. A reception intensity time sequence obtained every intermittent receiving interval $\Delta t$ is labelled as R(t) and stored into a memory. The stored time sequence R(t) is then undergoes a linear-prediction analysis by least-squares method.

A reception intensity at the next time is predicted from an analysis result. When the prediction result is continuously equal to or less than an out-of-range discrimination threshold value (the number of times of continuation has been preset), the intermittent receiving interval is doubled. That is, the intermittent interval is extended. An example of the predicted value is shown by a white circle (○) in the diagram. The method of linear predictive analysis has been described in detail in Triceps Co. Ltd., "High Efficiency Audio Encoding for Digital Mobile Communication", pages 37–49.

After the intermittent receiving interval has been doubled (2·$\Delta t$), a decimating operation is performed so as to also set to the time sequence R(t) to the 2·$\Delta t$ interval. The reception intensity at the next time is predicted from the decimated R(t). When the predictive result indicates that it is continuously equal to or less than the out-of-range discrimination threshold value, the intermittent receiving interval is further doubled. By repeating the above operation, the intermittent receiving interval is extended to $2^n \cdot \Delta t$ (where, n is an integer of 0, 1, or 2 and an upper limit value of the intermittent receiving interval has been preset).

Figure 2:
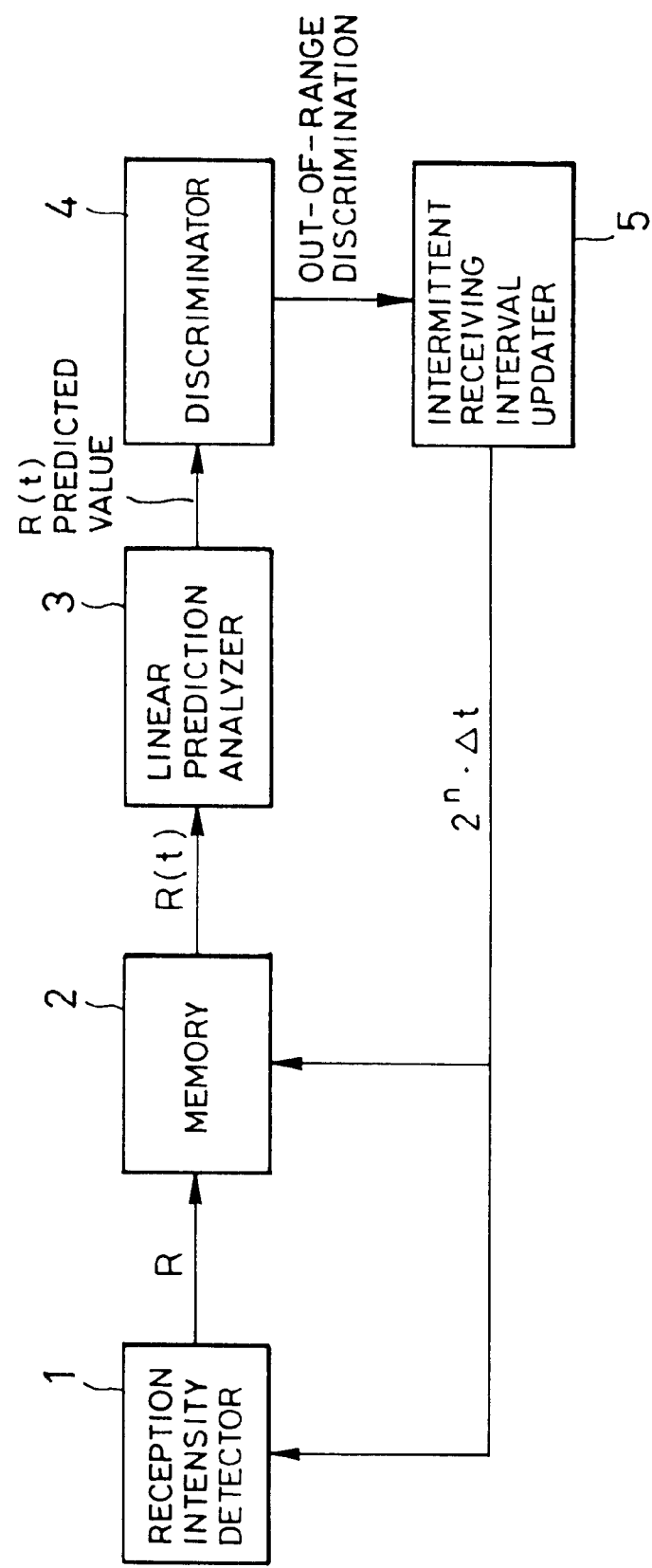
FIG. 2 is a diagram showing the structure to realize the operation of the portable radio unit of the first embodiment of the invention.

FIG. 2 shows a construction of the first embodiment to realize the above operation.

As shown in the diagram, a portable radio unit system of the embodiment is constructed by blocks of a reception intensity detector 1 of control information, a memory 2, a linear prediction analyzer 3, a discriminator 4, and an intermittent receiving interval updater 5.

First, an intensity R detected by the reception intensity detector 1 is stored into the memory 2. The stored reception intensity time sequence R(t) is analyzed by the linear prediction analyzer 3, thereby obtaining a predicted value of R(t) at the next time. Whether the user is in a range or out of range is discriminated by the discriminator 4 on the basis of the obtained predicted value. A discrimination threshold value and a continuity discrimination value that is equal to or less than the threshold value have been preset in the discriminator 4.

Figure 3:
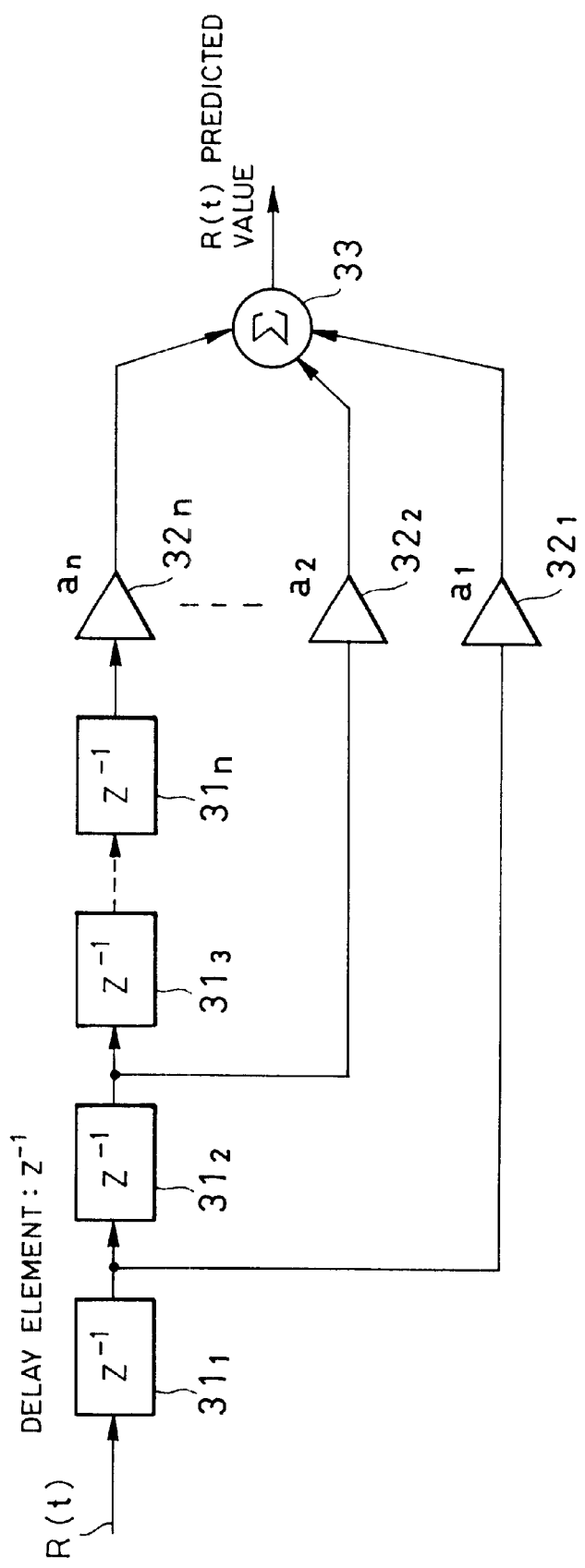
FIG. 3 is a diagram showing an example of the linear prediction analyzer 3.

The linear prediction analyzer 3 has, for example, a structure shown in FIG. 3 in which the incoming signal (time sequence R(t)) is supplied to a series of delay elements $31_1$ through $31_n$ and weight coefficients $a_1$ through $a_n$ are respectively multiplied at elements $32_1$ through $32_n$ to output signals of the delay elements $31_1$ through $31_n$, and multiplied values are summed at summing circuit 33. The predicted value of the time sequence R(t) is derived at the output of the summing circuit 33.

When a discrimination result indicates that the user is out of the range, the intermittent receiving interval is updated by the intermittent receiving interval updater 5. The maximum value of the intermittent receiving interval has been preset. The updated interval $2^n \cdot \Delta t$ is supplied to the reception intensity detector 1 and memory 2. The reception intensity detector 1 subsequently measures the reception intensity at the designated interval. The intensity time sequence R(t) is decimated in the memory 2 so as to obtain the decimated interval.

According to the first embodiment as mentioned above, since the time sequence of the reception intensity of the control information is analyzed by the method of least squares and the intermittent receiving interval is extended on the basis of the obtained predicted value of R(t) at the next time, the optimum intermittent receiving interval can be automatically set in accordance with a situation of the user which variably changes. An electric power consumption of the battery can be, thus, effectively saved more than the conventional one.

The second embodiment of the invention will now be described.

Figure 4:
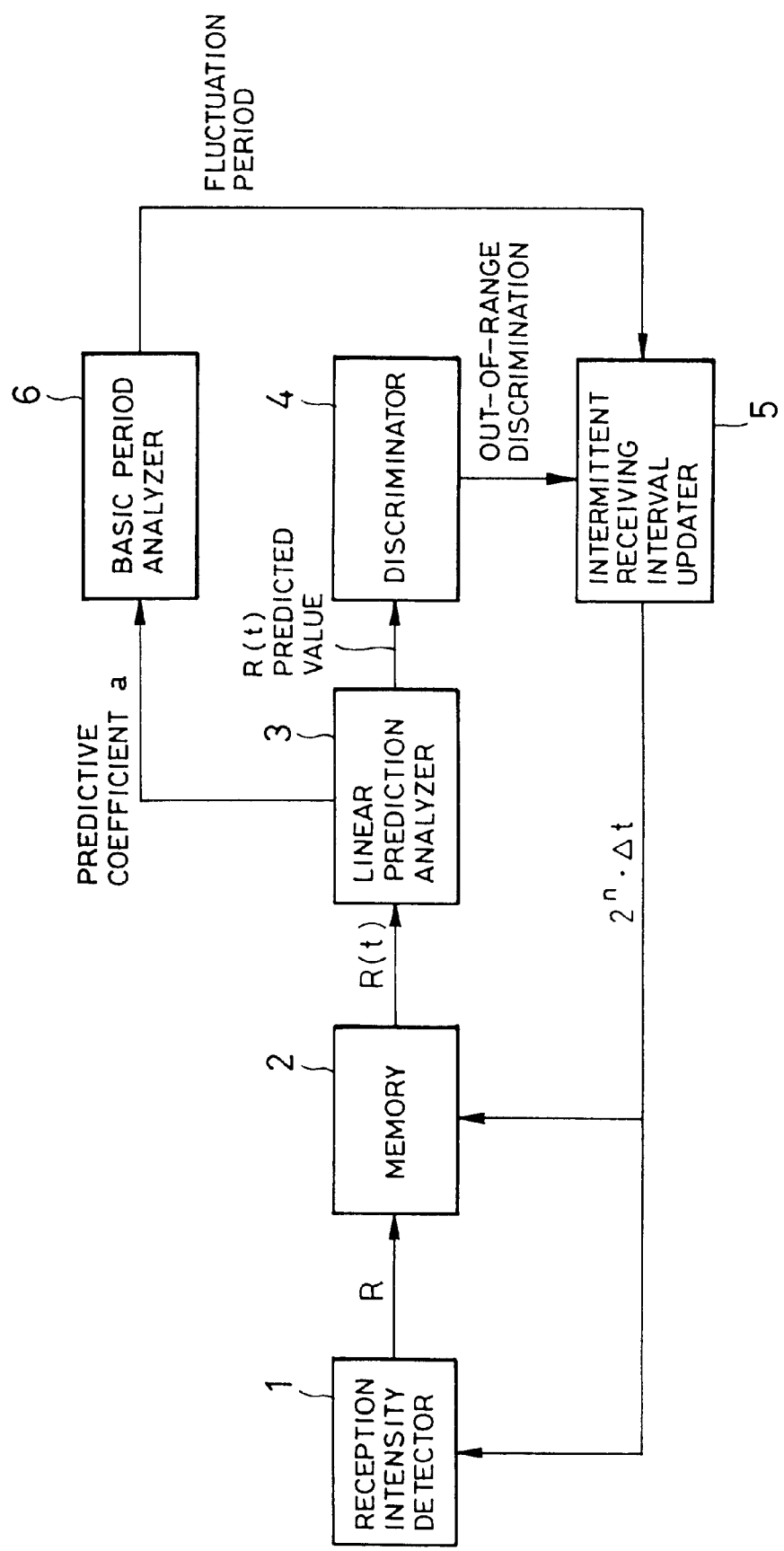
FIG. 4 is a diagram showing the structure of a portable radio unit according to the second embodiment of the invention.

FIG. 4 is a diagram showing the structure of a portable radio unit system showing the second embodiment of the invention and relates to an example obtained by adding a basic period analyzer 6 to the first embodiment. The same component elements as those in the first embodiment are designated by the same reference numerals and their descriptions are omitted here and only different points from the first embodiment will be described.

The linear prediction analyzer 3 obtains a linear prediction coefficient a(i) from the past time sequence R(t) and calculates a predicted value by the linear sum of R(t) and a(i). In this case, features on frequency characteristics of the time sequence R(t) are extracted and contained in the prediction coefficient a(i). The basic period analyzer 6 analyzes the prediction coefficient a(i), thereby obtaining the period of a fluctuation of the reception intensity time sequence R(t). The obtained fluctuation period is supplied to the intermittent receiving interval updater 5.

The intermittent receiving interval updater 5 calculates an updating amount from the out-of-range discrimination result and the fluctuation period. When the reception intensity fluctuates around the out-of-range discrimination threshold value, an updating amount is set according to the fluctuation period. That is, for instance, when the reception intensity fluctuates around the out-of-range discrimination threshold value at a period of about a few seconds, even if a call is received or transmitted, a talking environment is bad and a conversation is not accomplished. In such a case, the display is set to an area out of the range and the receiving interval is extended.

According to the second embodiment as mentioned above, there is a saving effect of the electric power consumption of the battery in a manner similar to the first embodiment. Since the fluctuation period of the reception intensity of the control information is monitored, further, the intermittent receiving interval under a bad environment such that the conversation is not accomplished can be extended, so that the further saving effect of the battery power consumption can be expected.

The third embodiment of the invention will now be described.

Figure 5:
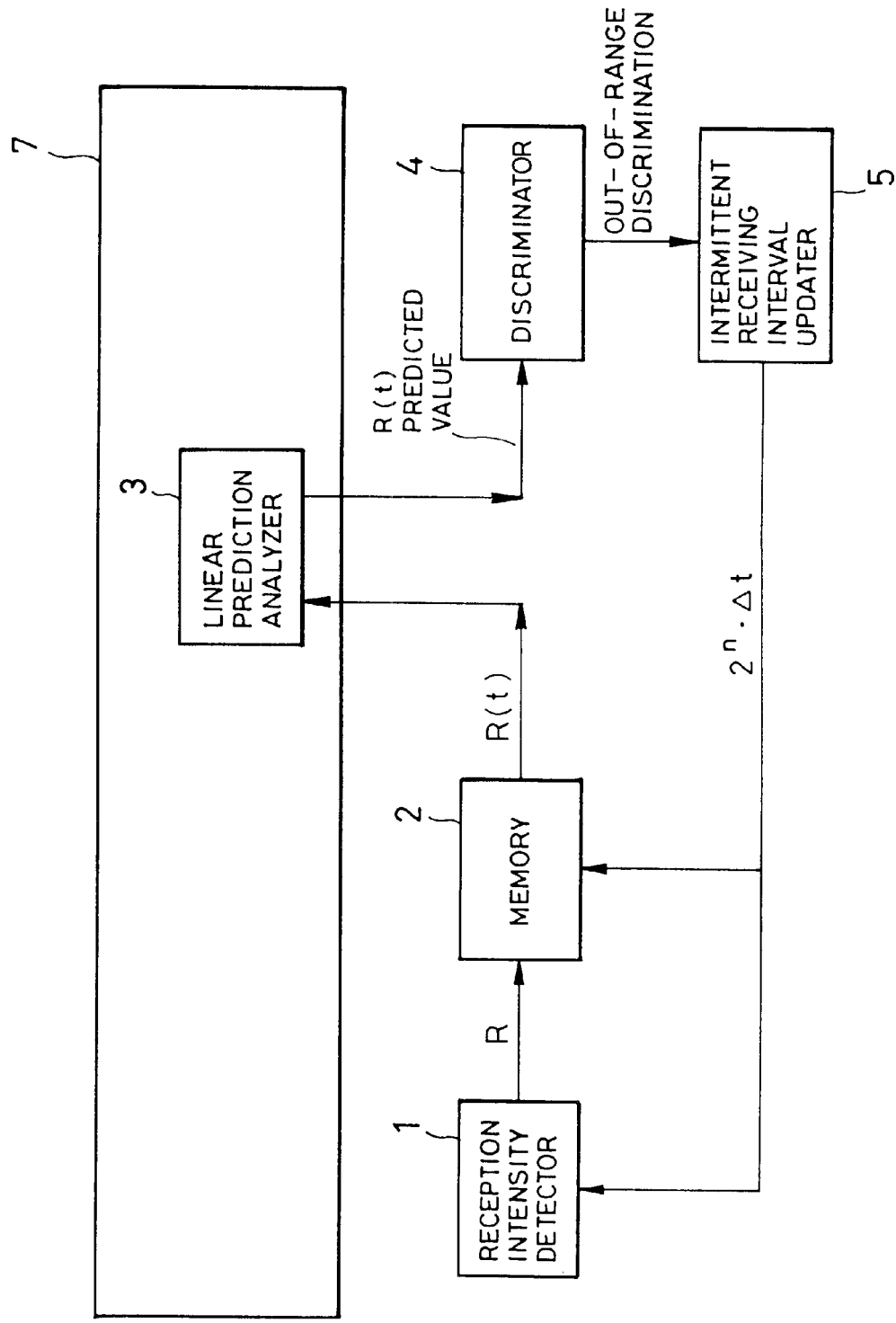
FIG. 5 is a diagram of the structure of a portable radio unit according to the third embodiment of the invention.

FIG. 5 is a diagram showing the structure of a portable radio unit system showing the third embodiment of the invention and relates to a construction in which the linear prediction analyzer 3 in the first and second embodiments is used in common with a vocoder 7. FIG. 5 shows a case where this construction is applied to the first embodiment. The same component elements as those in the first embodiment are designated by the same reference numerals and their descriptions are omitted here.

This construction is effective in, particularly, a digital type portable radio unit. The digital type portable radio unit has the vocoder 7 to encode a voice sound. It is inevitable that the vocoder 7 has the linear prediction analyzer 3. The vocoder 7 does not operate during the intermittent reception. The linear prediction analyzer 3 during the intermittent reception that is necessary in the invention, therefore, can be used in common with the vocoder 7. The operation is similar to that in the first and second embodiments.

According to the third embodiment as mentioned above, there is a saving effect of the battery power consumption in a manner similar to the first and second embodiments. Further, since the linear prediction analyzer 3 is used in common with the vocoder 7, an effect of reduction of a hardware scale can be expected.

The fourth embodiment of the invention will now be described.

Figure 6:
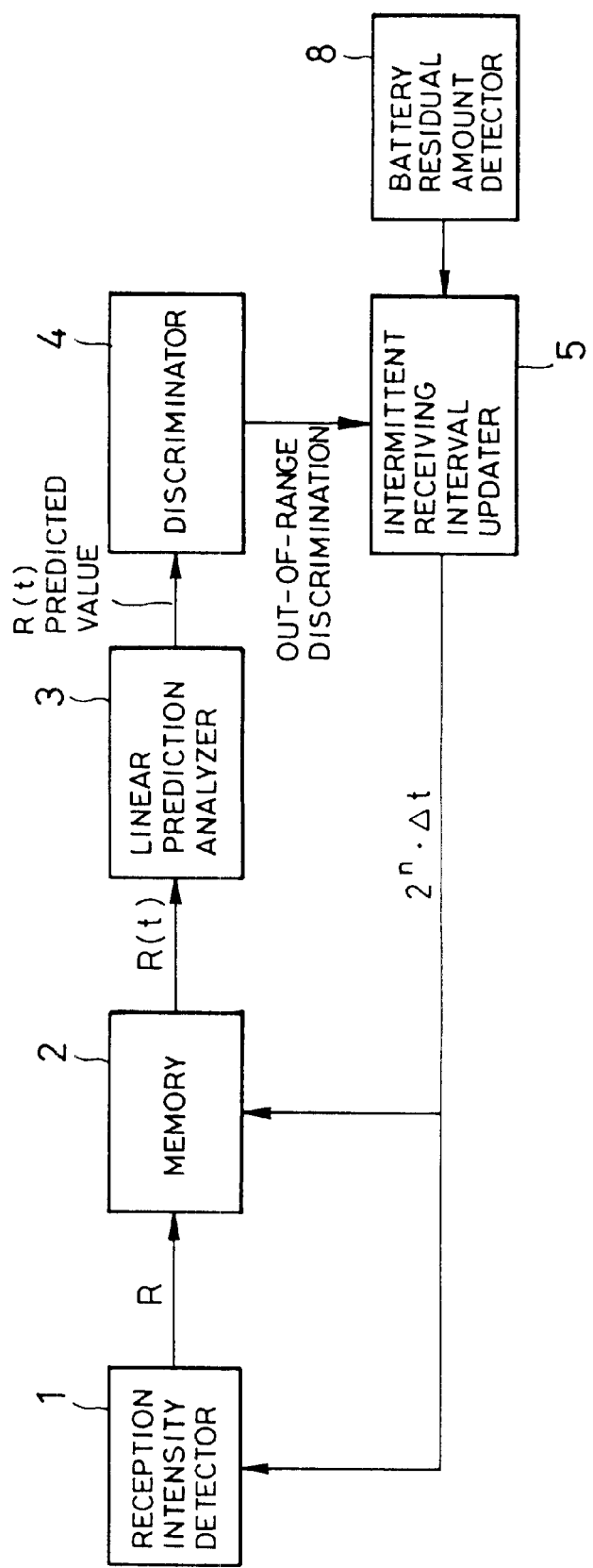
FIG. 6 is a diagram showing the structure of a portable radio unit according to the fourth embodiment of the invention.

FIG. 6 is a diagram showing the structure of a portable radio unit according to the fourth embodiment of the invention and relates to a construction in which a battery residual amount detector 8 is added to the first embodiment. A similar additional construction can be applied to the second and third embodiments. The same component elements as those in the first embodiment are designated by the same reference numerals and their descriptions are omitted here.

It is a feature of the fourth embodiment that an intermittent reception updating amount is increased when a battery residual amount that is detected by the battery residual amount detector 8 is small.

According to the fourth embodiment as mentioned above, there is a saving effect of the battery power consumption in a manner similar to the first to third embodiments. Since the intermittent receiving interval can be controlled according to the battery residual amount, a further saving effect of the battery power consumption can be expected.

The fifth embodiment of the invention will now be described.

Figure 7:
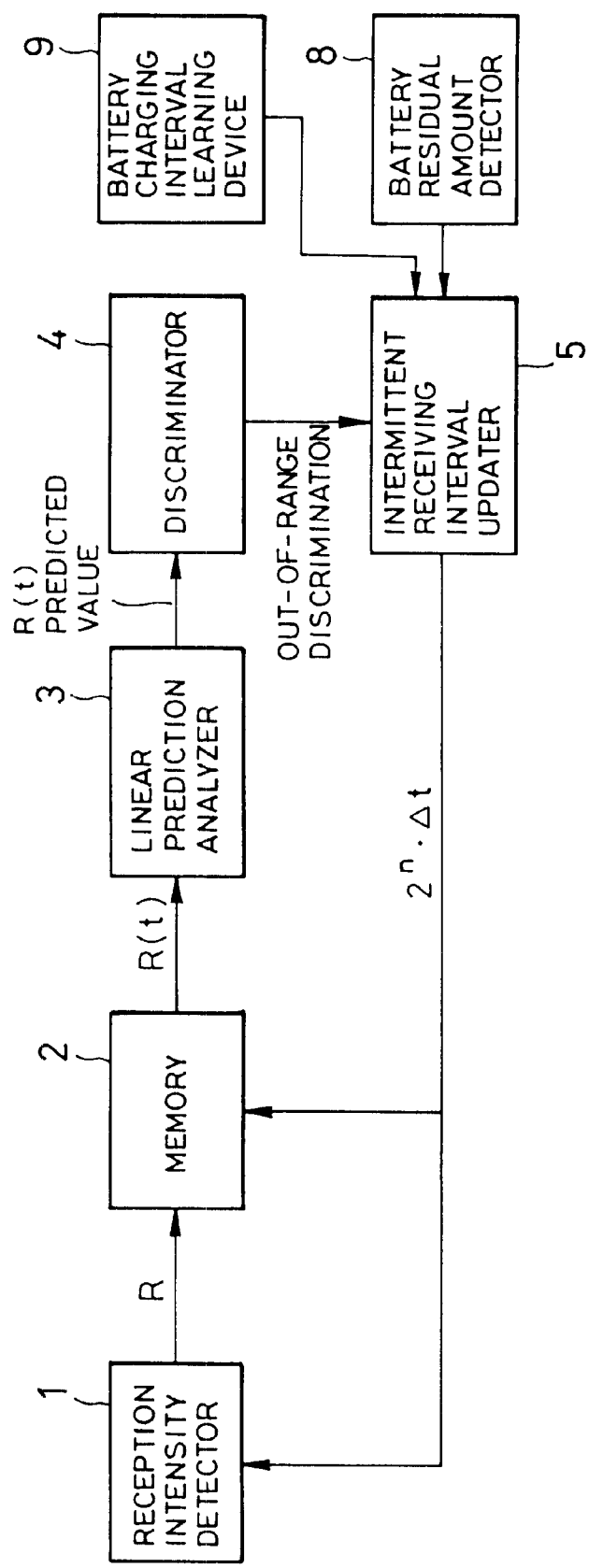
FIG. 7 is a diagram showing the structure of a portable radio unit according to the fifth embodiment of the invention.

FIG. 7 is a diagram showing the structure of a portable radio unit according to the fifth embodiment of the invention and relates to a construction in which a battery charging interval learning device 9 is added to the fourth embodiment. The same component elements as those in the fourth embodiment are designated by the same reference numerals and their descriptions are omitted here.

In the embodiment, the added battery charging interval learning device 9 has a function to learn an interval at which the user charges the battery. The general portable radio unit user sets the portable radio unit to a charger and charges it after he comes home. The time and interval that is set are variable depending on the life style of the user. In the added battery charging interval learning device 9, therefore, the average values of the time and interval until and at the portable radio unit is set to the charger are calculated and memorized. The intermittent receiving interval updater 5 predicts the time when the portable radio unit is set to the charger and sets the receiving interval so that the battery capacity remains until the predicted time.

According to the fifth embodiment as mentioned above, there is a saving effect of the battery power consumption in a manner similar to the first to fourth embodiments. Further since the intermittent receiving interval can be controlled according to the predicted value of the time until the battery is charged and the battery residual amount, a further saving effect of the battery power consumption can be expected.

The sixth embodiment of the invention will now be described.

Figure 8:
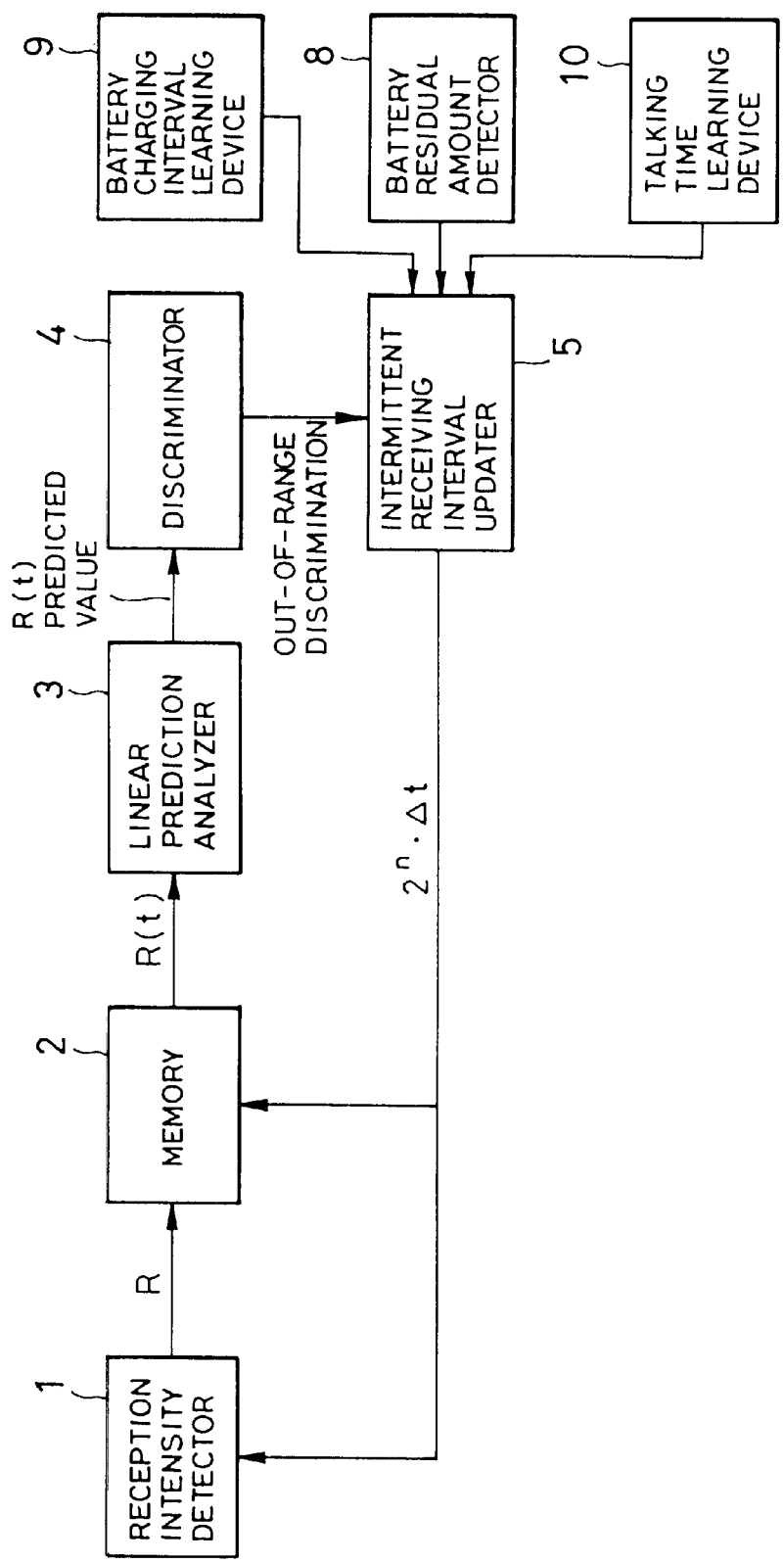
FIG. 8 is a diagram showing the structure of a portable radio unit according to the sixth embodiment of the invention.

FIG. 8 is a diagram showing the structure of a portable radio unit according to the sixth embodiment of the invention and relates to a construction in which a talking time learning device 10 is added to the fifth embodiment. The same component elements as those in the fifth embodiment are designated by the same reference numerals and their descriptions are omitted here.

In the embodiment, the added talking time learning device 10 has a function to learn the talking time of the user. A power consumption amount of the battery of the portable radio unit largely varies depending on the talking time. The talking time also varies depending on the life style of the user. The talking time learning device 10, therefore, calculates the average value of the talking time of the user and memorizes it. The intermittent receiving interval updater 5 predicts the time when the portable radio unit is set to the charger, further predicts the talking time until the setting time, and sets the receiving interval so that the battery capacity remains until the predicted time.

According to the sixth embodiment as mentioned above, there is a saving effect of the battery power consumption in a manner similar to the first to fifth embodiments. Since the intermittent receiving interval can be further controlled according to the predicted value of the time until the battery is charged, the predicted value of the talking time, and the battery residual amount, a further saving effect of the battery power consumption can be expected.

The seventh embodiment of the invention will now be described.

Figure 9:
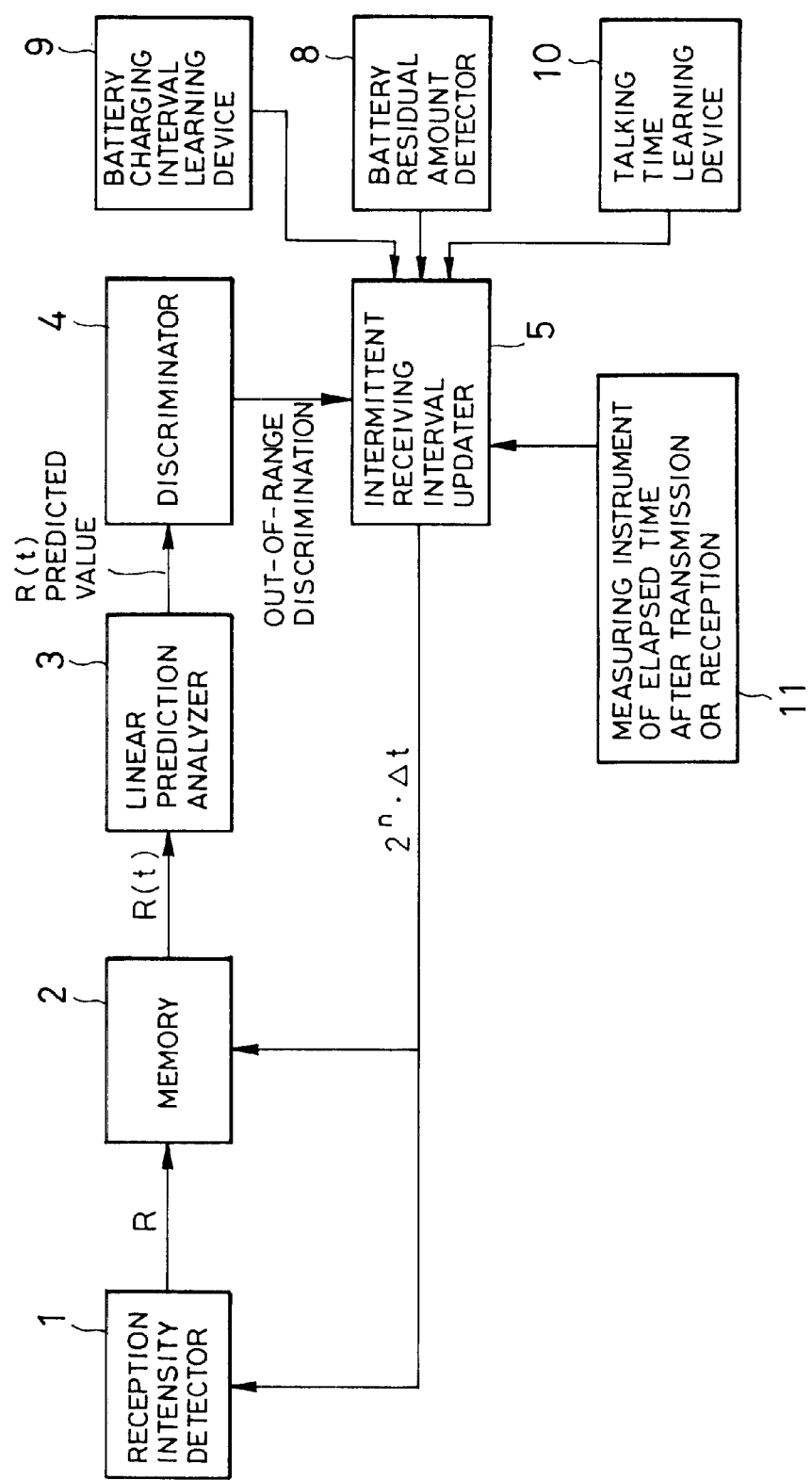
FIG. 9 is a diagram showing the structure of a portable radio unit according to the seventh embodiment of the invention.

FIG. 9 is a diagram showing the structure of a portable radio unit according to the seventh embodiment of the invention and relates to a construction in which a measuring instrument 11 of the elapsed time after transmission or reception is added to the sixth embodiment. The same component elements as those in the sixth embodiment are designated by the same reference numerals and their descriptions are omitted here.

As a general using method of the portable radio unit system by the user, a possibility such that he subsequently receives or calls after the transmitting operation, the call reception, the talking, or the like is high. The elapsed time measuring instrument 11 after the transmission or reception measures the elapsed time after the operation as mentioned above. The intermittent receiving interval updater 5 sets the updating interval to a short time when the elapsed time is short.

According to the seventh embodiment as mentioned above, there is a saving effect of the battery power consumption in a manner similar to the first to sixth embodiments. Since the elapsed time from the end of the transmitting, receiving, or talking operation is further measured and the intermittent receiving interval is controlled on the basis of the measured elapsed time, a further saving effect of the battery power consumption can be expected.

The invention is not limited to the above embodiments but many modifications are possible on the basis of the spirit of the present invention and they are not excluded from the scope of the invention.

According to the invention as described in detail above, the following effects can be obtained.

(A) Since the time sequence of the reception intensity of the control information is analyzed by the method of least squares and the intermittent receiving interval is extended on the basis of the obtained predicted value, the optimum intermittent receiving interval can be automatically set in accordance with the situation of the user which variably changes. The battery power consumption can be, consequently, more effectively saved than the conventional one.

(B) There is the saving effect of the battery power consumption. Since the fluctuation period of the reception intensity of the control information is further monitored, the intermittent receiving interval under the bad environment such that the conversation is not accomplished can be extended, so that the further saving effect of the battery power consumption can be expected.

(C) There is the saving effect of the battery power consumption. Since the linear prediction analyzer is used in common with the vocoder, the effect of reducing the hardware scale can be expected.

(D) There is the saving effect of the battery power consumption. Further, since the intermittent receiving interval can be controlled according to the battery residual amount, the further saving effect of the battery power consumption can be expected.

(E) There is the saving effect of the battery power consumption. Further, since the intermittent receiving interval can be controlled according to the predicted value of the time until the battery is charged and the battery residual amount, the further saving effect of the battery power consumption can be expected.

(F) There is the saving effect of the battery power consumption. Further, since the intermittent receiving interval can be controlled according to the predicted value of the time until the battery is charged, the average value of the talking time, and the battery residual amount, the further saving effect of the battery power consumption can be expected.

(G) There is the saving effect of the battery power consumption. Further, since the elapsed time from the end of the transmitting, receiving, or talking operation is measured and the intermittent receiving interval can be controlled according to the measured elapsed time, the further saving effect of the battery power consumption can be expected.

What is claimed is:

1. A control method of a portable radio unit for use in a mobile system comprising the steps of:
   (a) measuring a reception intensity of control information by a reception intensity detector;
   (b) performing a time-sequential linear-predictive analysis on said measured reception intensity by a linear prediction analyzer;
   (c) predicting a reception intensity at a next time;
   (d) setting a receiving interval of the control information on the basis of said predicted reception intensity;
   (e) measuring the reception intensity of said control information on the basis of said set receiving interval;
   (f) decimating said measured reception intensity on the basis of a receiving interval set by an intermittent receiving interval updater; and
   (g) repeating said series of operations (a) through (f), thereby reducing an electric power consumption of a battery in a wait standby mode.

2. A control method a portable radio unit according to claim 1, wherein a fluctuation period of the reception intensity is obtained by using a prediction coefficient calculated to predict said reception intensity at the next time, and it is controlled so as to extend the receiving interval in the case where said obtained fluctuation period becomes so short as to obstruct a talking and the reception intensity is also small.

3. A control method according to claim 1, wherein by using said linear prediction analyzer in common with an audio encoder, a hardware scale is reduced.

4. A control method according to claim 2, wherein by using said linear prediction analyzer in common with an audio encoder, a hardware scale is reduced.

5. A control method according to claim 1, wherein by adding a battery residual amount detecting function, the intermittent receiving interval is controlled in accordance with a battery residual amount.

6. A control method according to claim 2, wherein by adding a battery residual amount detecting function, the intermittent receiving interval is controlled in accordance with a battery residual amount.

7. A control method according to claim 3, wherein by adding a battery residual amount detecting function, the intermittent receiving interval is controlled in accordance with a battery residual amount.

8. A control method according to claim 4, wherein by adding a battery residual amount detecting function, the intermittent receiving interval is controlled in accordance with a battery residual amount.

9. A control method according to claim 5, wherein by adding a battery charging interval learning function, the intermittent receiving interval is controlled in accordance with a prediction value of a time that is required until a portable radio unit is set to a charger and the battery residual amount.

10. A control method according to claim 6, wherein by adding a battery charging interval learning function, the intermittent receiving interval is controlled in accordance with a prediction value of a time that is required until a portable radio unit is set to a charger and the battery residual amount.

11. A control method according to claim 7, wherein by adding a battery charging interval learning function, the intermittent receiving interval is controlled in accordance with a prediction value of a time that is required until a portable radio unit is set to a charger and the battery residual amount.

12. A control method according to claim 8, wherein by adding a battery charging interval learning function, the intermittent receiving interval is controlled in accordance with a prediction value of a time that is required until a portable radio unit is set to a charger and the battery residual amount.

13. A control method according to claim 9, wherein by adding a talking time learning function, the intermittent receiving interval is controlled in accordance with the prediction value of the time that is required until the portable radio unit is set to the charger, an average talking time, and the battery residual amount.

14. A control method according to claim 10, wherein by adding a talking time learning function, the intermittent receiving interval is controlled in accordance with the prediction value of the time that is required until the portable radio unit is set to the charger, an average talking time, and the battery residual amount.

15. A control method according to claim 11, wherein by adding a talking time learning function, the intermittent receiving interval is controlled in accordance with the prediction value of the time that is required until the portable radio unit is set to the charger, an average talking time, and the battery residual amount.

16. A control method according to claim 12, wherein by adding a talking time learning function, the intermittent receiving interval is controlled in accordance with the prediction value of the time that is required until the portable radio unit is set to the charger, an average talking time, and the battery residual amount.

17. A control method according to claim 1, wherein a function to measure an elapsed time after completion of a transmitting or receiving operation is added, a multiplier according to the elapsed time after completion of said operation is replaced to a linear filter whose high band is attenuated, and the intermittent receiving interval is controlled in accordance with a reception field intensity.

* * * * *